Figures 1, 2:
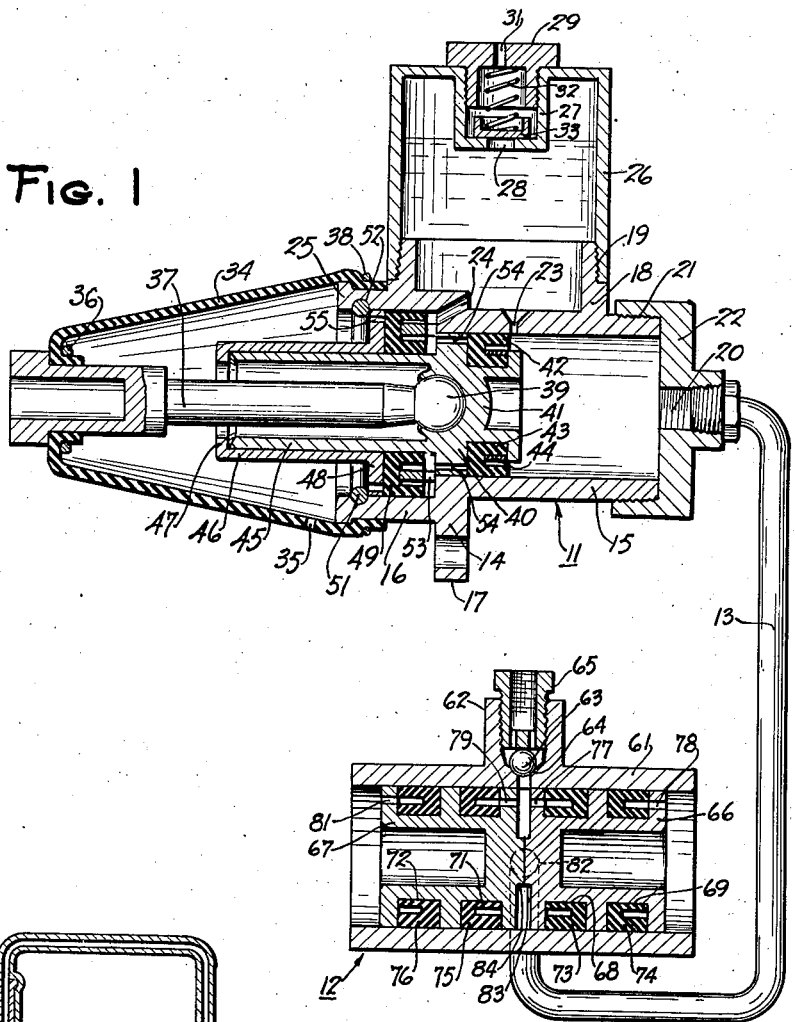

Dec. 20, 1938.　　　　E. G. CARROLL　　　　2,140,733
BRAKE

Original Filed April 13, 1932

INVENTOR.
EUGENE G. CARROLL
BY Jerome R. Cox
ATTORNEY.

Patented Dec. 20, 1938

2,140,733

UNITED STATES PATENT OFFICE 2,140,733

BRAKE

Eugene G. Carroll, Los Angeles, Calif., assignor to Bendix Aviation Corporation, South Bend, Ind., a corporation of Delaware Original application April 13, 1932, Serial No. 605,083, now Patent No. 2,074,719, dated March 23, 1937. Divided and this application May 25, 1935, Serial No. 23,426

2 Claims. (Cl. 60—54.6)

This invention relates to brakes and more especially to hydraulic operating systems therefor.

One of the objects of the invention is to provide improved means for preventing the ingress of air into the operating parts of the system and especially into the wheel cylinders thereof.

Further objects of the invention will be apparent after a reading of the subjoined specification and claims and after a consideration of the attached drawing in which:

Figure 1 is a view showing, more or less diagrammatically, parts of a hydraulic braking system including a master cylinder, a wheel cylinder, and connections between the master cylinder and the wheel cylinder; and Figure 2 is a view showing a modified form of wheel cylinder.

Referring in particular to the drawing, there is shown in Figure 1 a master cylinder generally designated 11, a wheel cylinder generally designated 12 and fluid connections indicated by the line 13. The cylinder 11 is formed of a casting 14 having a forwardly extending cylindrical portion 15 and a rearwardly extending cylindrical portion 16 having a larger diameter. On the under side of the casting 14 there is formed a downwardly extending bracket 17 by which the cylinder 11 may be secured to an automotive vehicle. The upper side of the casting is formed with an annular range 18 forming a well and is exteriorly threaded as at 19 for the reception of a cover which is designed to coact with the frame to serve as a fluid reservoir.

The casting 11 is formed at its forward end with threads 21 for the reception of an outlet cap 22. It has a restricted inlet port 23 formed through the cylindrical portion 15 and opening into the well formed by the annular flange 18 and has a relatively large port 24 extending diagonally through the junction between the concentric cylindrical portions 15 and 16. The rear end of the casting 14 is provided with an annular flange 25 by means of which a boot may be secured to the casting.

Secured on the threads 19 is a cylindrical cover 26 which serves together with the well formed by the flange 18 to provide a container or reservoir for a reserve supply of liquid for the hydraulic braking system. The upper end of the cap 26 is formed with a cylindrical depression 27 having an opening 28 in the center thereof. A plug 29 having a vent opening 31 is screwed into the depression 27 and serves as an abutment for a compression spring 32 which bears at its lower end upon a cup valve 33. The spring 32 is of such a weight that pressure within the reservoir may be increased to a certain predetermined amount before any fluid can escape past the valve which thus constitutes a spring loaded valve.

The cap 22 is provided with a tapped opening 20 into which there is threaded a pipe forming a portion of the connection 13. Secured to the rear end of the casing 14 by means of the flange 25 is a rubber boot 34 which serves to exclude dust and dirt but allows the ingress of air through an opening 35. Passing through the boot 34 and secured thereto by a spring clip 36 is a piston rod 37 which is connected in any convenient manner to a pedal for operating the braking system. The forward end of the boot is secured over the flange 25 by a spring clip 38 and the forward end of the piston rod 37 is formed with a ball head 39 through which it is secured to a plunger or piston 40.

The plunger 40 is formed with a head 41 which substantially fills the bore of the cylindrical portion 15 and as an aid in sealing the bore, carries an annular sealing cup 42. The cup 42 may be made of rubber or other suitable material and serves to prevent the passage of fluid rearward past the head 41. The cup 42 is secured in an annular groove 43 by means of a circular flat spring ring 44. The plunger 40 is provided with a rearwardly extending cylinder 45 which telescopes within a sleeve 46 formed with a rearward flange 47 for limiting the rearward movement of the piston 39 and with a fixed head 48 substantially filling the bore of the portion 16 and serving as a support for an annular sealing cup 49.

The sleeve 46 and the head 48 are prevented from being displaced rearwardly by means of a spring stop 51 seated in a groove 52 and are prevented from being displaced forwardly by means of a tubular member 53 which bears at its forward end against the shoulder formed by the junction between the portions 15 and 16 and bears at its rearward end on the annular cup 49 thus serving not only to position the cylinder 46 but also serving to maintain the cup 49 in the desired position. The movable head 41 and the fixed head 48 are each formed with a plurality of small ports such as 54 and 55 respectively through which fluid may pass forwardly.

The wheel cylinder 12 comprises a cylindrical casting 61 formed with an upstanding annular flange or boss 62 which forms a well within which there is positioned a ball 63 normally adapted to seat upon a cooperating valve seat 64 and to prevent the escape or ingress of fluid through the boss which thus forms a bleed opening. The projection 62 is formed with threads and a vented plug 65 having a wrench receiving head is screwed into said projection and normally maintains the ball 63 upon its seat. Positioned in the casting 61 are a pair of plungers or pistons 66 and 67, each formed with a pair of annular grooves such as 68 and 69, and 71 and 72 respectively. The grooves 68, 69, 71 and 72 are provided with packing cups 73, 74, 75 and 76 respectively, said cups serving to prevent the exit or ingress of fluid from or into the wheel cylinder. It is to be noted that the cups 74 and 76 face outward while the cups 73 and 75 face inward. The plunger 66 is provided with a port 77 leading from the interior of the wheel cylinder to the groove 68 and with a port 78 leading to the atmosphere from the groove 69. The plunger 67 is similarly provided with ports 79 and 81. The plungers are also provided with inwardly extending projections 83 and 84 which position the plungers to insure that the inlet opening 82 from the conduit 13 shall always remain open.

In preparing the hydraulic brake system shown in Figure 1 for operation, the plug 29 and the valve 33 are removed and the reservoir 26 is filled with suitable liquid. The plug 65 is backed off from its seat so as to allow the check valve 63 to move at times off of its seat in the bleeding operation. Reciprocation of the rod 37 and the piston formed by the movable head by means of the pedal, forces any air trapped in the system out past the check valve 63 on the forward stroke and at the same time draws liquid from the reservoir 26 through the port 24 and into the chamber formed between the fixed head 48 and the movable head 41. On the rearward stroke liquid from between two heads is sucked past the movable head by reason of the vacuum created in the system ahead of said movable head. On the next forward stroke, this liquid together with the trapped air is forced out past the check valve 63. Reciprocation is continued until the system is completely filled with liquid and until all air is driven out from the system.

Thereupon the plug 65 is screwed down to maintain the check valve 63 upon its seat and the valve 33 and the plug 29 are reinserted in the position shown in the drawing. Thereafter, reciprocation of the plunger 40 serves to apply the brakes through the wheel cylinder. When the reservoir is first filled and bled and the assembly including the plug 29 inserted, the pressure on the liquid in the reservoir is approximately atmospheric. The movement of the plunger 40 forward forces liquid to the wheel cylinders and thus lowers the pressure in the reservoir. On account of this lowering of pressure and because no air can enter through the valve 33, some air is drawn in through the vent 35 and the ports 55 and is subsequently compressed in the upper end of the reservoir 26 to maintain the liquid in the system under supercharged pressure, the amount of such pressure being controlled by the weight of the spring 32.

The wheel cylinder 91 shown in Figure 2 is substantially the same as the cylinder 12 previously described and is provided with an annular boss or projection 114 corresponding to the projection 62. However, a floating tubular member 115 is provided for holding the cups 116 and 117 in position when the fluid in the cylinder is not under brake applying pressure. It is to be understood that when operating pressure is applied to the fluid, the fluid itself maintains the cups in their position. The plungers are also provided with additional packing cups 116a and 117a smaller in area and facing outward. It is possible to make the cups 116a and 117a smaller than the cups 116 and 117 for the reason that cups 116 and 117 have to accommodate the floating tubular member 115. The projection 114 is internally threaded as at 118 and has screwed therein a plug 119 formed with a conical end adapted to seat in a conical shaped valve seat concentric with the projection 114. The plug 119 is itself formed with a tapped opening 120 and with intersecting bores 121 and 122. A bleeding hose 123 provided with a check valve 124 is adapted to be threaded into the tapped opening 120 for the bleeding operation, the plug 118 being adapted to be loosened for the same operation.

In the bleeding operation of the wheel cylinder shown in Figure 2, the plug 118 is backed off slightly from its seat and the bleeding hose 123 is attached. Then liquid is forced to the wheel cylinders and is thence forced out past the check valve 124 carrying with it any air which may be trapped in the system. On the return stroke, the check valve 124 prevents air from returning into the wheel cylinder. It is to be understood that during the bleeding operation, the plug 118 is backed off slightly from its seat.

This application is a division of my copending application Serial No. 605,083, filed April 13, 1932 issued on March 23, 1937 as Patent No. 2,074,719.

It is to be understood that the above described embodiments of my invention are for the purpose of illustration only and various changes may be made therein without departing from the spirit and scope of the invention.

I claim:

1. In a hydraulic brake system a wheel cylinder, a pair of plungers in said wheel cylinder, a pair of annular packing cups associated with each plunger, the outer cups facing outwardly and the inner cups facing inwardly and being of larger cross-section than the outer cups, and a sleeve between the pistons accommodated by the larger cross-section of the inner packings to hold them in position.

2. In a hydraulic brake system a cylinder, a pair of plungers in said cylinder, a pair of annular packing cups, one associated with each of said pistons and facing each other, and a relatively small tubular member interposed between said cups and normally holding said cups in position.

EUGENE G. CARROLL.